June 14, 1966     D. CENTURIONI     3,256,472
ELECTRICAL CONNECTING STRUCTURE FOR ROLLED CAPACITORS
Filed Dec. 10, 1962
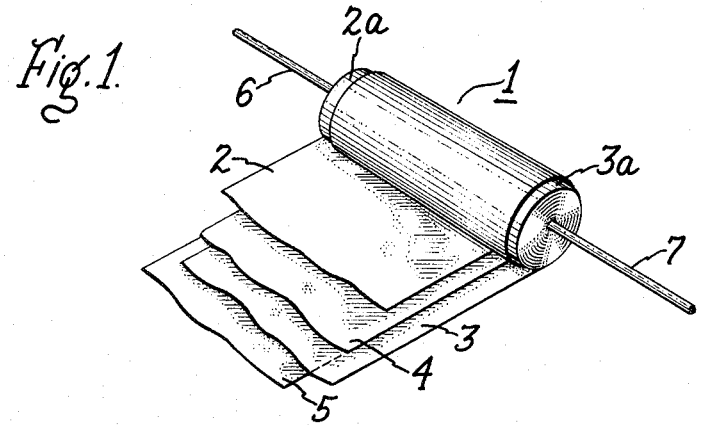
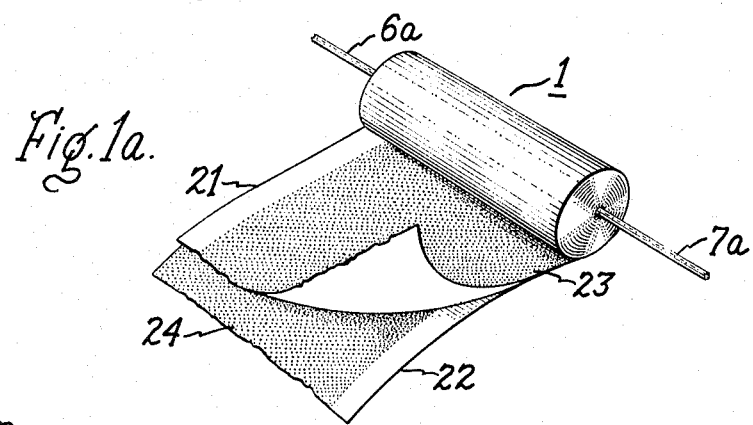
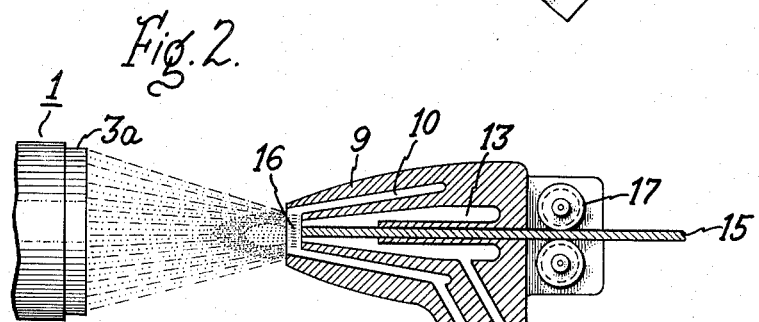
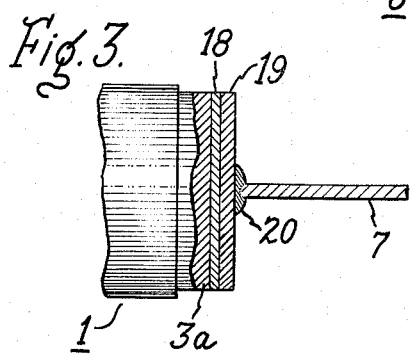
Inventor,
Dominick Centurioni,
by Sidney Greenberg
His Attorney.

United States Patent Office 3,256,472
Patented June 14, 1966

3,256,472
ELECTRICAL CONNECTING STRUCTURE
FOR ROLLED CAPACITORS
Dominick Centurioni, Glens Falls, N.Y., assignor to General Electric Company, a corporation of New York
Filed Dec. 10, 1962, Ser. No. 243,559
3 Claims. (Cl. 317—260)

The present invention relates to electrical connections to aluminum bodies, and more particularly to a method of making electrical lead connections to aluminum electrodes of electrical capacitors.

Aluminum electrodes have been preferred in the past for use in many types of electrical capacitors because of their good current-carrying ability, corrosion resistance, low cost, freedom from metal migration, lightness coupled with good mechanical strength, and other advantages. However, it is more difficult to make electrical connection to aluminum electrodes than to electrodes of other metals such as tin, lead, and zinc. Whereas good electrical joints have been made, for example, to exposed vacuum metallized zinc electrodes in noninductively wound capacitors by simply spraying a conventional lead-tin solder on the end of the wound roll, such treatment in the case of aluminum electrodes, either vacuum metallized or foil, results in connections which are mechanically weak and of poor current-carrying ability. Heretofore, in order to make connections to aluminum foil electrodes, scrub soldering with tin-zinc solders has been used, but such process is inconvenient, time-consuming and difficult to apply to various electrode arrangements and the connection made thereby is somewhat lacking in mechanical strength and current-carrying ability for discharge capacitors. Scrub soldering is not suitable for vacuum deposited electrodes.

It is an object of the invention to provide an improved electrical connection to aluminum bodies, and especially to aluminum capacitor electrodes, and to provide a simple and economical method of making such connections.

It is a specific object of the invention to provide improved electrical lead connections to aluminum electrodes of foil or metallized type in wound electrical capacitors.

It is another object of the invention to provide solder-aluminum joints of the above type which have improved current-carrying ability, mechanical strength, and moisture resistant properties.

A further object of the invention is to provide a spray method for producing joints of the above type.

Other objects and advantages will become apparent from the following description and the appended claims.

In a broad aspect, the invention relates to a joint structure having low electrical resistance and high mechanical strength comprising an aluminum body, a fused particulate coating of aluminum firmly and intimately bonded to the aluminum body, and a fused particulate coating of a low melting solder metal, dissimilar to aluminum, which is firmly and intimately bonded to the aluminum coating.

In making an electrical lead attachment to the above-described joint structure, a lead wire is thereafter soldered to the outer solder coating thereof.

In the method of providing the described joint structure, the particulate aluminum coating and solder coating are deposited by metal spray processes.

The invention will be better understood from the following description taken in conjunction with the accompanying drawing, in which:

FIGURE 1 is a perspective view of a partially unrolled wound electrical exposed or extended foil capacitor having an electrical lead attachment in accordance with the invention;

FIGURE 1a is a view of another type of capacitor to which the invention is applicable;

FIGURE 2 is a view of a spraying arrangement which may be employed in a process of making the electrical lead attachment of the FIGURE 1 capacitor; and FIGURE 3 is a fragmentary detailed view, partly in section, of the electrical joint structure of the invention provided on the FIGURE 1 capacitor.

Referring now to the drawing, and particularly to FIGURE 1, there is shown a capacitor roll 1 comprising aluminum foil electrodes 2 and 3 convolutely interwound with intervening dielectric strips 4 and 5 composed of any known or suitable insulating material, such as kraft paper, synthetic resin such as Mylar, fiber glass, reconstructed mica or other dielectric materials. Aluminum electrode foils 2 and 3 are, in the illustrated embodiment, laterally offset from one another so as to project beyond the edges of the interleaved dielectric strips 4 and 5 and provide exposed foil portions 2a and 3a at opposite ends of wound capacitor roll 1. Conducting lead wires 6 and 7 are respectively secured to electrode foil portions 2a and 3a by the process more fully described hereinafter.

Instead of being foil strips, electrodes 2 and 3 may be constituted by metallized layers of aluminum on any suitable substrate, such as sheets of any of the aforementioned insulating material. Such aluminum metallized layers may be applied to the substrate by any suitable process, such as by vapor deposition, chemical deposition, or other metal depositing methods known in the art.

Capacitor roll 1 may be impregnated with dielectric material as conventional in the art, either of liquid or solid type, as for example mineral oil, castor oil, mineral wax, chlorinated aromatic compounds, or other suitable dielectric material. Where a liquid dielectric impregnant is used, the capacitor unit is enclosed in a suitable casing (not shown) containing the dielectric liquid.

FIGURE 1a shows a different form of rolled capacitor to which the invention may be applied, comprising superposed dielectric sheets 21 and 22 having metallized aluminum electrode layers 23 and 24 respectively deposited thereon, as by known vacuum evaporation techniques. The aluminum coatings are applied on only one surface of each dielectric sheet with a margin left free of aluminum along one side and arranged as shown to avoid the risk of short circuits between the electrode layers in the wound roll. In the rolled condition the edge of each metallized aluminum layer on the side of the sheet opposite the margin is sufficiently exposed to be contacted by the sprayed coating hereinafter described.

In accordance with the invention, the exposed electrode edges of the capacitor roll, e.g., the end surfaces of exposed foil portions 2a and 3a of the FIG. 1 capacitor, are initially sprayed with a thin coating of substantially pure aluminum and thereafter a coating of soft solder, such as a lead-tin alloy, is applied to the sprayed aluminum coating by spraying. The conductive leads 6 and 7 which are typically tinned copper wire, are then placed in contact with the outer solder coating and soldered thereto by application simply of sufficient heat, or the combination of heat and additional solder material placed at the joint.

FIGURE 2 shows a spraying arrangement which may be employed for carrying out the process of the invention. As will be understood, the means for applying the stream of metal particles of both the aluminum and solder coating may be any of various types and are not restricted to that shown. In the illustrated apparatus, metal spray gun 8 is arranged to direct a stream of atomized molten metal particles at the edge surfaces of exposed aluminum electrode portion 3a of roll capacitor 1, which may be held in a suitable fixed support and provided with suitable masking means (not shown) to avoid deposition of the metal particles thereon except on the selected portion. Spray gun 8 comprises head portion 9 formed with an outer annular opening 10 for the passage of compressed air received through supply tube 11 via a passageway in handle 12, and an inner chamber 13 for receiving via another passageway in the handle a combustible mixture of gases such as acetylene and oxygen from delivery conduit 14. Wire 15, composed of the metal to be sprayed on the capacitor end face, is fed through an axial passage in head 9, the wire being progressively moved toward nozzle 16 of the spray gun by means of feeding mechanism 17. In the metal spraying operation, the leading end of wire 15 is continually moved forward into the center of the fuel gas chamber 13 and through nozzle 16 where it is melted by the flame of the fuel gas and atomized by the compressed air blast which propels the metal particles toward capacitor 1.

FIGURE 3 shows in greater detail the structure of the lead attachment made to the wound capacitor roll in accordance with the present invention. Exposed aluminum foil portion 3a of capacitor roll 1 is provided with a thin aluminum coating 18, the latter in turn being coated with a solder layer 19, and attached thereto by solder 20 is conductive lead 7. By virtue of being applied by the described spraying procedure, aluminum undercoating 18 and outer solder layer 19 are each constituted by a uniformly distributed, porous deposit of discrete, fused metallic particles, each particulate coating 18 and 19 being in intimate, firmly bonded contact with the surface on which it is sprayed.

The sprayed end coatings of the invention, in addition to affording a markedly improved current-carrying and mechanically strong electrical attachment as described, facilitate the impregnation of the wound capacitor roll with dielectric liquid, since the dielectric liquid may be introduced through the porous metallic layers.

Solder coating 19 is preferably composed of a low melting, fusible or meltable metal or alloy having a melting point not higher than about 700° C., especially for the purposes of attaching a conducting lead wire such as wire 7 to the sprayed joint. However, for other purposes where there are no additional attachments to be made to the solder coating, higher melting temperature solder metals could be used, if desired. Satisfactory solder metal for the purposes of the invention may be composed, for example, of a lead-tin alloy in any proportions, or either metal alone. The following are particular examples of lead-tin solder compositions which have been found satisfactory for use in the invention:

70% tin-30% lead; 97% tin-3% lead; 60% tin-40% lead; 20% tin-80% lead; 89% tin, 7.3% antimony, 3.5% copper, 0.2% lead; 10% tin, 13% antimony, .25% copper, balance lead.

Examples of other particular solder compositions found satisfactory are: 75% tin-25% zinc, 91% tin-9% zinc.

It will be understood, however, that a wide variety of solder metals or alloys other than those specified above could be employed, if desired.

The following is a typical process which may be carried out for producing the joint structure of the invention, it being understood that the description is set forth simply for purposes of illustration. Using aluminum foil strips ¼ mil thick and a pair of kraft paper dielectric sheets ¼ mil thick between the aluminum electrode foils and with the foils laterally offset to provide an exposed foil margin of 1/16 inch, a roll capacitor is provided by winding up the foil and dielectric strip assembly so as to provide exposed foil portions at opposite ends of the roll. A kraft paper wrapper is then applied around the roll to hold it in wound condition. The roll is then placed in a suitable masking and racking device, after which an aluminum coating is sprayed onto the exposed foil end faces to a thickness of approximately 1/64 inch and thereafter a solder coating composed of 60% tin and 40% lead is sprayed thereon to form a coating approximately 1/32 inch thick. The particular thicknesses of the metallic coatings applied are dependent on the current loads to be carried, the type of lead to be attached, and the mechanical lead strength required. If a tap strap is to be placed on the connection flatwise, a thinner coating would be suitable as compared to the arrangement where a lead wire is to be attached endwise. Also, if later cleaning processes or other machining steps are necessary or desirable, it is appropriate to have a sufficiently thick coating of solder to compensate for any reduction of thickness due to such steps. After the application of the solder coating, tinned copper wire leads are attached thereto by the application of heat with a soldering iron. If desired, solder material may be added to provide a more secure connection to the solder coating. Thereafter, the capacitor is placed in a vessel, either in encased or unencased condition for introduction of dielectric liquid therein. The dielectric liquid, either of hardenable or non-hardenable type, is then flowed into the end of the capacitor for impregnating the capacitor roll therewith, after which the capacitor is sealed in the casing, if provided, or encapsulated with a suitable coating material.

In a series of tests made to compare the current-carrying ability of electrical lead attachments made in accordance with the invention with those made using other procedures, a number of units of both types were given a 30-minute test at amperages ranging from 75 to 325 amperes. It was found that none of the units made in accordance with the invention failed at less than 325 amperes, whereas comparative units which had been sprayed only with the lead-tin solder without an intervening aluminum layer failed at less than 325 amperes.

By applying an aluminum coating on the aluminum electrode edges in accordance with the invention prior to application of the solder coating, there is avoided the problem arising from galvanic corrosion, especially under non-hermetic seal conditions, between the solder coating and the underlying aluminum base member in contact therewith, as has affected prior electrical attachment structures. In view of the limited edge contact between the exposed vacuum deposited aluminum electrode and the dissimilar solder metal of the prior structures, even a relatively small amount of such galvanic corrosion would be sufficient to substantially interfere with the electrical and mechanical connection between the two parts. The present invention largely overcomes this difficulty by (1) entirely avoiding any galvanic reaction between the intervening sprayed coating and the underlying aluminum electrode edges in contact therewith by using similar metals, and (2) by virtue of the extensive interfacial area between the intervening sprayed aluminum coating and the outer dissimilar solder metal which would still provide good electrical connection even if some galvanic corrosion occurred therebetween.

Referring again to FIGURE 1, the respective electrode strips 2 and 3 may, if desired, be aligned with the edge of a different one of the dielectric strips. Thus, electrode 2 may have its outer edge aligned with the adjacent edge of dielectric strip 4, and electrode 3 may have its outer edge aligned with the adjacent edge of dielectric strip 5. In this way, in the finally wound roll, the aligned exposed edges of the electrode-dielectric combination afford an even larger surface area for contact by the sprayed metallic aluminum particles and thereby enhance the firm bond between the aluminum layer and the end of the capacitor roll.

As used in the claims, the expression "aluminum electrode" is intended to include an electrode in the form of an aluminum coating, however deposited, on a suitable base material, as well as that in the form of aluminum foil.

The joint structure of the invention and the method of making it may be found appropriate for use in applications other than that described above where a strong mechanical connection is desired between parts, one of which is aluminum, especially where galvanic corrosion is a problem. Accordingly, while the present invention has been described with reference to particular embodiments thereof, especially an electrical capacitor, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electrical capacitor comprising a superposed assembly of aluminum electrode layers of opposite polarity separated by dielectric material, the edges of the aluminum layers of at least one polarity being exposed at one side of said assembly, a fused particulate coating of aluminum intimately and firmly bonded to said aluminum electrode edges, a fused particulate coating of a low melting solder metal dissimilar to aluminum intimately and firmly bonded to said particulate aluminum coating, and an elongated conducting member secured to said solder metal coating.

2. An electrical capacitor comprising a superposed assembly of a pair of aluminum electrodes and intervening dielectric strips convolutely wound into a roll, the edges of at least one of said aluminum electrodes being exposed at one end of said roll, a fused particulate coating of aluminum intimately and firmly bonded to said exposed aluminum electrode edges, a fused particulate coating of a low melting solder metal dissimilar to aluminum firmly and intimately bonded to said aluminum coating, and an elongated conducting member soldered to said solder metal coating.

3. An electrical capacitor comprising a superposed assembly of a pair of aluminum electrodes and intervening dielectric strips convolutely wound into a roll, the edges of at least one of said aluminum electrodes being exposed at one end of said roll, and aligned with the edges of one of said dielectric strips, a fused particulate coating of aluminum intimately and firmly bonded to said aligned exposed aluminum electrode and dielectric strip edges, a fused particulate coating of a low melting solder metal dissimilar to aluminum firmly and intimately bonded to said aluminum coating, and an elongated conducting member soldered to said solder metal coating.

References Cited by the Examiner

UNITED STATES PATENTS

| | | | |
|---|---|---|---|
| 2,887,649 | 5/1959 | Peck | 317—260 |
| 2,915,808 | 12/1959 | Clemons | 29—25.42 |
| 2,921,246 | 1/1960 | Peck | 317—260 |
| 3,009,086 | 11/1961 | Rice et al. | 317—260 |
| 3,040,415 | 6/1962 | Rayburn | 29—25.42 |
| 3,094,651 | 6/1963 | Lehner et al. | 317—260 |

FOREIGN PATENTS 712,559  7/1954  Great Britain.

BERNARD A. GILHEANY, *Primary Examiner.*

JOHN P. WILDMAN, *Examiner.*

JOHN F. BURNS, LARAMIE E. ASKIN, W. F. ZAGURSKI, D. J. BADER, *Assistant Examiners.*